(12) United States Patent
Josefowicz et al.

(10) Patent No.: US 8,760,072 B2
(45) Date of Patent: Jun. 24, 2014

(54) POWER SUPPLY FOR LIGHT EMITTING DIODE ROADWAY LIGHTING FIXTURE

(75) Inventors: Jack Yitzhak Josefowicz, Halibut Bay (CA); Alan Shawn Winters, Stillwater Lake, CA (US); Qiuning Chen, Halifax (CA); Mark Adam Neary, Mount Uniacke (CA)

(73) Assignee: LED Roadway Lighting Ltd., Nova Scotia (CA)

( * ) Notice: Subject to any disclaimer, the term of this patent is extended or adjusted under 35 U.S.C. 154(b) by 290 days.

(21) Appl. No.: 13/146,359

(22) PCT Filed: Jan. 26, 2010

(86) PCT No.: PCT/CA2010/000110
§ 371 (c)(1),
(2), (4) Date: Sep. 19, 2011

(87) PCT Pub. No.: WO2010/085882
PCT Pub. Date: Aug. 5, 2010

(65) Prior Publication Data
US 2012/0001566 A1    Jan. 5, 2012

Related U.S. Application Data

(60) Provisional application No. 61/147,653, filed on Jan. 27, 2009.

(51) Int. Cl.
*H05B 41/24* (2006.01)
(52) U.S. Cl.
USPC ............................................ 315/247; 315/308
(58) Field of Classification Search
USPC .............. 315/200 R, 246–247, 291, 307–308
See application file for complete search history.

(56) References Cited

U.S. PATENT DOCUMENTS

| 6,013,988 A | 1/2000 | Bucks et al. |
| 6,094,014 A | 7/2000 | Bucks et al. |

(Continued)

FOREIGN PATENT DOCUMENTS

| AU | 2005100501 A4 | 7/2005 |
| CN | 201053902 Y | 4/2008 |

(Continued)

OTHER PUBLICATIONS

Bourgeois, J.M.; Circuits for Power Factor Correction With Regards to Mains Filtering; STMicroelectronics Application Note; 1999; pp. 1-9; AN510/0894; Italy.

(Continued)

*Primary Examiner* — Jason M Crawford
(74) *Attorney, Agent, or Firm* — Stevens & Showalter, LLP

(57) ABSTRACT

A high efficiency light emitting diode power supply for roadway lighting fixtures is provided. The power supply enables conditioning and monitoring of input power and monitors LEDs current to ensures consistent performance of the LED by changing a power correction factor. The LED output can also be adjusted based upon age or external input parameters and by modifying the power correction factor value. In addition, the LED output can be dimmed, turned down in output to a lower level at any time of night for a prescribed duration in order to further save energy. This dimming function uses a programming scheme that keeps track of the "seasons" (summer, fall, winter and spring) so that time of night is tracked accurately all year long.

22 Claims, 6 Drawing Sheets

(56) References Cited

U.S. PATENT DOCUMENTS

| | | |
|---|---|---|
| 6,147,458 A | 11/2000 | Bucks et al. |
| 6,577,512 B2 * | 6/2003 | Tripathi et al. ............ 363/21.17 |
| 6,586,890 B2 | 7/2003 | Min et al. |
| 7,030,572 B2 | 4/2006 | Nijhof et al. |
| 7,202,608 B2 | 4/2007 | Robinson et al. |
| 7,825,602 B2 | 11/2010 | Hu et al. |
| 8,002,440 B2 | 8/2011 | Lan et al. |
| 8,203,445 B2 | 6/2012 | Recker et al. |
| 2006/0071614 A1 * | 4/2006 | Tripathi et al. ............... 315/291 |
| 2008/0224636 A1 * | 9/2008 | Melanson ..................... 315/307 |
| 2009/0243517 A1 * | 10/2009 | Verfuerth et al. ............. 315/315 |
| 2010/0117545 A1 | 5/2010 | Kelly et al. |
| 2010/0134024 A1 | 6/2010 | Brandes |
| 2010/0271178 A1 | 10/2010 | Ahmad |
| 2011/0001626 A1 | 1/2011 | Yip et al. |
| 2011/0109229 A1 | 5/2011 | Akins |
| 2011/0215736 A1 | 9/2011 | Horbst et al. |
| 2012/0075859 A1 | 3/2012 | Granado et al. |
| 2012/0119647 A1 | 5/2012 | Hsu |
| 2012/0146548 A1 | 6/2012 | Campbell et al. |

FOREIGN PATENT DOCUMENTS

| | | |
|---|---|---|
| GB | 2444387 A | 4/2008 |
| WO | 02096162 A1 | 11/2002 |
| WO | 2008112820 A2 | 9/2008 |

OTHER PUBLICATIONS

Andrew O'Malley; International Search Report; International Application No. PCT/CA2010/000110; May 28, 2010; pp. 1-4; Canadian Intellectual Property Office; Gatineau, Quebec, CA.

* cited by examiner

POWER SUPPLY FOR LIGHT EMITTING DIODE ROADWAY LIGHTING FIXTURE

TECHNICAL FIELD

The present disclosure relates to light emitting diodes power supply and in particular to LED power supply for a roadway lighting fixture.

BACKGROUND

Roadway or street lighting fixtures are exposed to a range of environmental factors that impact performance and longevity of lighting fixtures. Existing roadway lighting commonly uses high-intensity discharge lamps, often high pressure sodium lamps (HPS). The power supply designs have been relatively simply but the light quality, efficiency and controllability of the fixtures has been less than ideal. The introduction next generation lighting fixtures such as light emitting diode (LED) based lighting fixtures provides greater efficiency, light quality and controllability however present challenges in ensuring reliable operation for the life of the lighting fixture. Factors such as thermal control, power efficiency, current regulation and packaging constraints must be accounted for to meet operation requirements. The temperature extremes and packaging restraints require an efficient design to ensure reliability. Providing a power supply that meets the demanding design requirements and cope with environmental extremes has not to date been achievable.

Accordingly, apparatus and methods that enable an improved LED power supply remains highly desirable.

SUMMARY

In accordance with the present disclosure there is provided a method of operating a power supply for light emitting diode (LED) module in a roadway fixture, the method comprising: performing electro-magnetic interference (EMI) filtering of an incoming alternating current (AC) current; performing AC to direct current (DC) rectification of the AC current; stepping down the rectified DC current based upon a power correction factor (PFC) value; providing the stepped down DC current to the LED module; measuring a current through the LED module; determining the PFC value based upon at least the measured current through the LED module; feeding-back the determined PFC to control the stepped down DC current.

In accordance with the present disclosure there is also provided a power supply for use with a light emitting diode (LED) module in a roadway lighting fixture, the power supply comprising: an electro-magnetic interference filter for filtering an alternating current (AC) current; an AC rectifier for rectifying the AC current to a direct current (DC) current; a power factor correction (PFC) circuit maintaining the DC current waveform in phase with line voltages by switching a flyback transformer based upon a received PFC value; a secondary side filtering module for reducing voltage and current ripple in the DC current; an LED current sensor module for detecting a current value used by the LED module in a return line from the LED module; and a micro-controller for monitoring the LED current and processing input to determine the PFC value to be applied to the flyback transformer based upon the detected LED current value.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Figure 1:
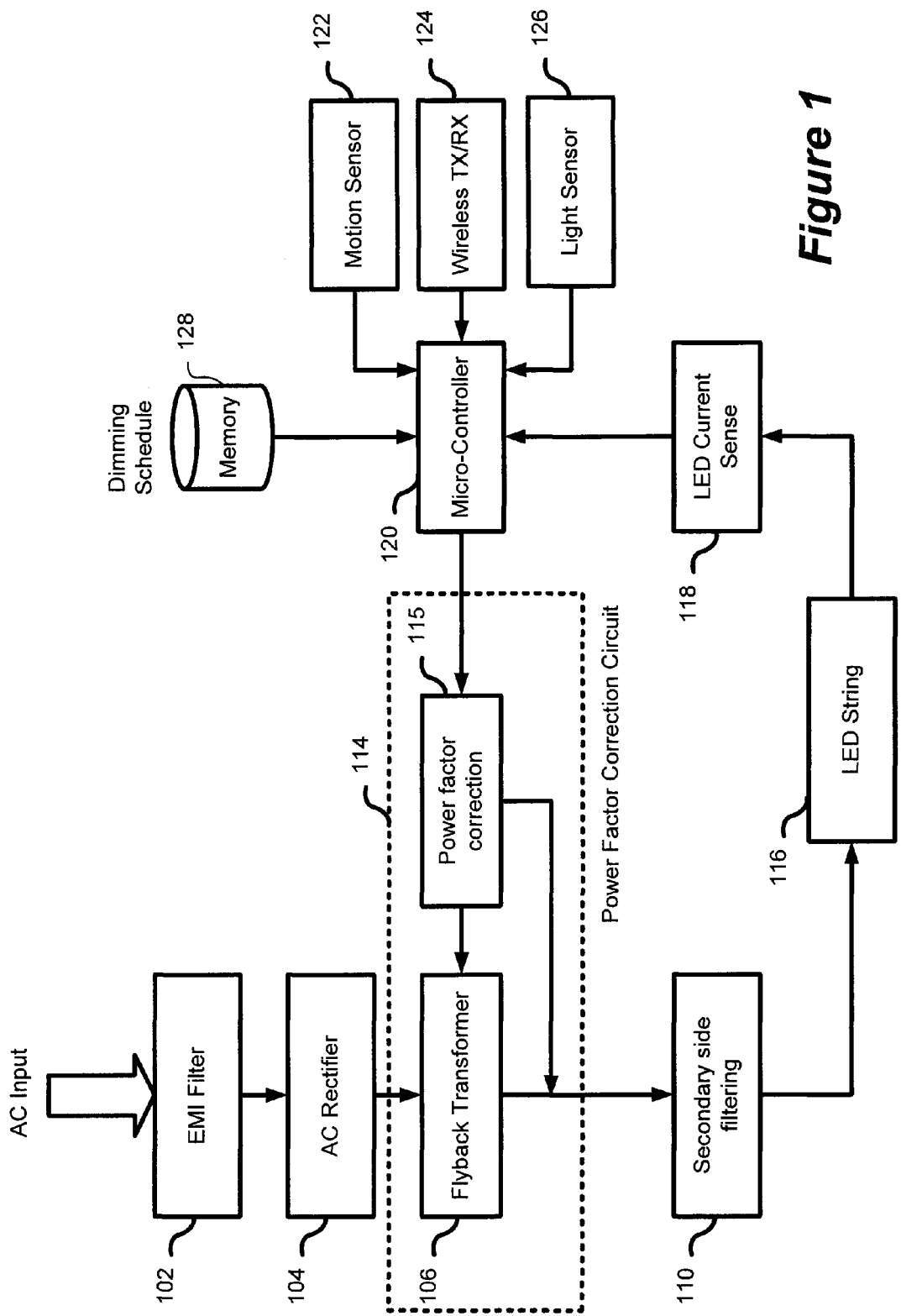
FIG. 1 shows a representation of light emitting diode power supply.

Embodiments are described below, by way of example only, with reference to FIGS. 1-6.

The power supply is designed to provide LEDs with controllable constant current that determines lumen output. The power supply is programmable for constant current control by counting the number of times the light turns on and off. The power supply uses the number of turn on cycles in order to add incremental current increases over time, i.e., some fixed increment in current (and therefore wattage) every turn on cycle for 20 years. The power supply has a selectable control mode to allow a single constant current over the lifetime of the power supply. The power supply has extremely high electrical efficiency; which is accomplished by performing AC to DC conversion using a single stage, discontinuous mode, flyback converter to minimize switching losses and the number of components that leads to the high efficiency. In addition, a power factor correction circuit may use a power factor correction IC such as the ST Microelectronics™ L6562 in a single stage, discontinuous mode, flyback converter that leads to the high efficiency. Constant current monitoring is performed using a device such as a micro-controller ATtiny85™ to sample the output current with minimal effect on the output and power draw of the supply that leads to the high efficiency P-N semiconductor devices (i.e., Diodes, Mosfets, etc. . . . ) with current ratings higher than that of which is required (for example, 2 or 3 times higher) are utilized to allow operation at the very low end of the devices' limits, providing maximum efficiency for the rated input and load that leads to the high efficiency. The power supply has a life expectancy of 20+ years. This is accomplished in part by using high reliability components (i.e., Automotive and aircraft grade or better) with extended temperature ranges (+125° C. minimum) that leads to maximum life, over sized and/or over rated components to ensure components operate well with their design limits that leads to maximum life, eliminating the use of aluminum electrolytic capacitors, which are a high failure rate component, that leads to maximum life, providing superior thermal dissipation using an aluminum core circuit board with a thermally conductive dielectric such as Laird's Thermagon or Arlon Tpreg™, mounted directly to the thermally conductive, aluminum fixture housing providing a heat sink for the power supply that is open to the convective air currents of the outside that leads to maximum life, and superior vibration resistance using surface mount components which lie flat against the circuit board for maximum support and potted circuit board for additional support, that lead to maximum life.

The power supply is designed with the ability to allow control of the current levels to the LED's using devices such as for example an Atmel ATtiny85 programmable micro-controller that can be programmed to accept data from external sensors to control the output from the LEDs. The LED output can be triggered by, for example motion detection, time of night dimming, temperature compensation, wireless control, etc.

The power supply provides a micro-controller controlled, closed loop feedback constant current to the LED's while being highly efficient and with a high power factor. A high power factor (for example >0.98) reduces wasted energy between the utility and the power supply, while high efficiency (90%+) reduces wasted power between the power supply and the LED's. The design uses the approach of using a power factor correction circuit operating in transition mode (i.e. discontinuous mode) to provide power factor correction and flyback switching all with one chip, reducing the component count and increasing the efficiency and power factor. Because the power factor correction circuit needs a large voltage ripple from, for example a bridge rectifier, for proper detection of the phase of the input voltage, the normally large, bulky, electrolytic input filter capacitors can be replaced with much smaller, more reliable, film or ceramic capacitors.

The control circuit to limit the amount of current going to the LED's is unique, in that it can increase the current going to the LED's as they age. The control circuit may start by providing the minimum amount of current to the LED's to provide the minimum lumen output as required by IES standards, and then gradually increases the current over time to maintain the lumen output to compensate for the natural reduction of lumen output by the aging LED's (LEDs decrease in output by 20% over 20 years). Running the LED's at lower currents make them much more efficient as they run much cooler. This can provide significant savings over HPS fixtures which need to have higher initial output (lumens) to maintain proper IES light levels towards the end of their life.

A micro-controller is used to control the current output. With a micro-controller being used to control the current in a closed loop feedback, other control schemes can easily be added such as motion detection to turn on or increase (or decrease) light output levels when a vehicle or pedestrian is present, temperature compensation to reduce current to the LED's if they are running too hot, ensuring a longer life, time of day dimming to have the light turn on or adjust light levels to coincide with traffic cycles, and remote control operation (i.e. wireless) to allow a remote programmable control that allows for changes in light levels in real time or change the programming of the micro-controller for particular events such as festivals, emergencies, tourist season, etc. . . .

The power supply is designed to accept any light input voltage, including two standard input voltages; i.e., 120 Vac, 60 Hz (North American Voltage) or 240 Vac, 50 Hz (European Voltage). For each input voltage a separate power supply is used. The overall design of each power supply is the same with only several changes in component values for each version to accept the lower or higher voltage and different frequencies. This method was used and preferred over typical universal input voltage designs because it keeps efficiency as high as possible by optimizing the component values for each supply and its corresponding input rather than making a compromise so that the power supply would work at all levels.

Referring to FIG. 1, the input AC current 101 is fed to the EMI filter 102 to limit any conducted interference introduced by the power supply to the utility grid by removing harmonic noise and conducted emissions that could transfer to the grid. A bridge rectifier 104 converts the AC input 101 to a DC input for the power factor correction circuit 114.

The power factor correction circuit (PFC) 114 receives the now rectified AC signal and switches a flyback transformer 106 according to a power factor correction value 115. The flyback transformer is switched with a Mosfet to produce the lower voltage required by the LED's. The PFC circuit 114 switches the flyback transformer 106 in sync with the AC line voltage, which keeps the current waveform in phase with the line voltage. This, in conjunction with limiting current spikes and peaks (harmonics), ensures good power factor, meaning that the apparent power produced by the utility, and the real power consumed by the power supply, are very close to being the same resulting in minimal wasted energy as the power supply cannot make full use of the power generated by the out of phase voltage and current. The PFC circuit 114 also provides over voltage and short circuit protection. The flyback transformer 106 converts high DC voltage to lower DC voltage (Voltage step-down eg. 165V to 36V).

Secondary side filtering 110 is provided to reduce ripple from voltage and current to provide a cleaner output. The reduced voltage waveform is then provided to drive the LED's 116. A current sense resistor 118 samples the current in the return line of the LED's, resulting in a small voltage which is directly proportional to the current flowing to the LED's.

The high ripple voltage, which represents a proportional current due to the nature of the PFC flyback converter, is fed to the micro-controller 120 (or micro-processor) input to be averaged in order to determine the average current passing through the LEDs 116 and then compared to a set value programmed into the micro-controller 120 memory. Depending on which turn-on cycle the power supply is at, which corresponds generally to the number of days the power supply has been operating for, the micro-controller 120 will adjust the voltage to the PFC circuit 114 in order to output the corresponding current referenced by the value residing in the micro-controller 120. The micro-controller may operate in a current-time ramp mode in order to provide an increasing LED current as the LEDs age. The age of the LEDs are determined generally from the number of turn-on cycles.

Alternatively, the micro-controller 120 may operate in a constant current mode in order to provide a constant LED current over the lifetime of the LED.

The micro-controller 120 counts each turn-on sequence and stores it into its internal memory to keep track of how many days it has been in operation. For the micro-controller 120 to log one day, the power supply is designed to monitor 'one time', as determined by for example the output current, for a minimum of 4 hours to reduce false counting due to power brown outs or outages, etc. . . . That is, one day is considered to have occurred when the LED current has been substantially the same for greater than 4 hours. It will be apparent that other methods of determining the number of days of operation, or the age of the LEDs are possible.

The day counter does not need to be precise, but provides a general indication of how long the fixture had been in use. With this scheme, the micro-controller 120 can be programmed to control the current to the LED's in any manner that is specified. Additional inputs may be provided to the micro-controller 120 such as motion sensors 122 to detect motion and turn on the LED allowing for energy savings. This applies to a situation where LED light is turned off during low traffic periods, typically after midnight. Wireless TX/RX interface 124 may be provided to program light to turn on or off and/or dim, and/or monitor performance remotely either through direct wireless communication or through wireless networks. An ambient light and/or light output sensor 126 may be provided to monitor LED output and daylight to control the desired light output. Other types of input such as temperature values may also be provided to provide improve efficiency of the power supply or trigger operation of the lighting fixture.

Further more the micro-controller 120 may further calculate the LED current level according to a dimming schedule stored in memory 128. The dimming schedule defines a desired light output level of the LED module over a length of a night period. The micro-controller 120 controls the output level by adjusting the PFC value used by the PFC circuit 114 when stepping down the DC voltage.

The power supply can be designed as a stand-alone supply to power an array of LED's in parallel, or can be designed to power a single string of LED's by adjusting the size and values of components for the given application and power requirements.

The power supply is a micro-controller controlled closed loop feedback PFC flyback controller operating as a constant current source. The LED efficiency, efficacy (lumens/watt), LED life expectancy, and light output are directly dependent on the current running through it. By maintaining a constant current level through the LED, these parameters can be tightly controlled. The power supply consists of 4 main sections.

Figure 2:
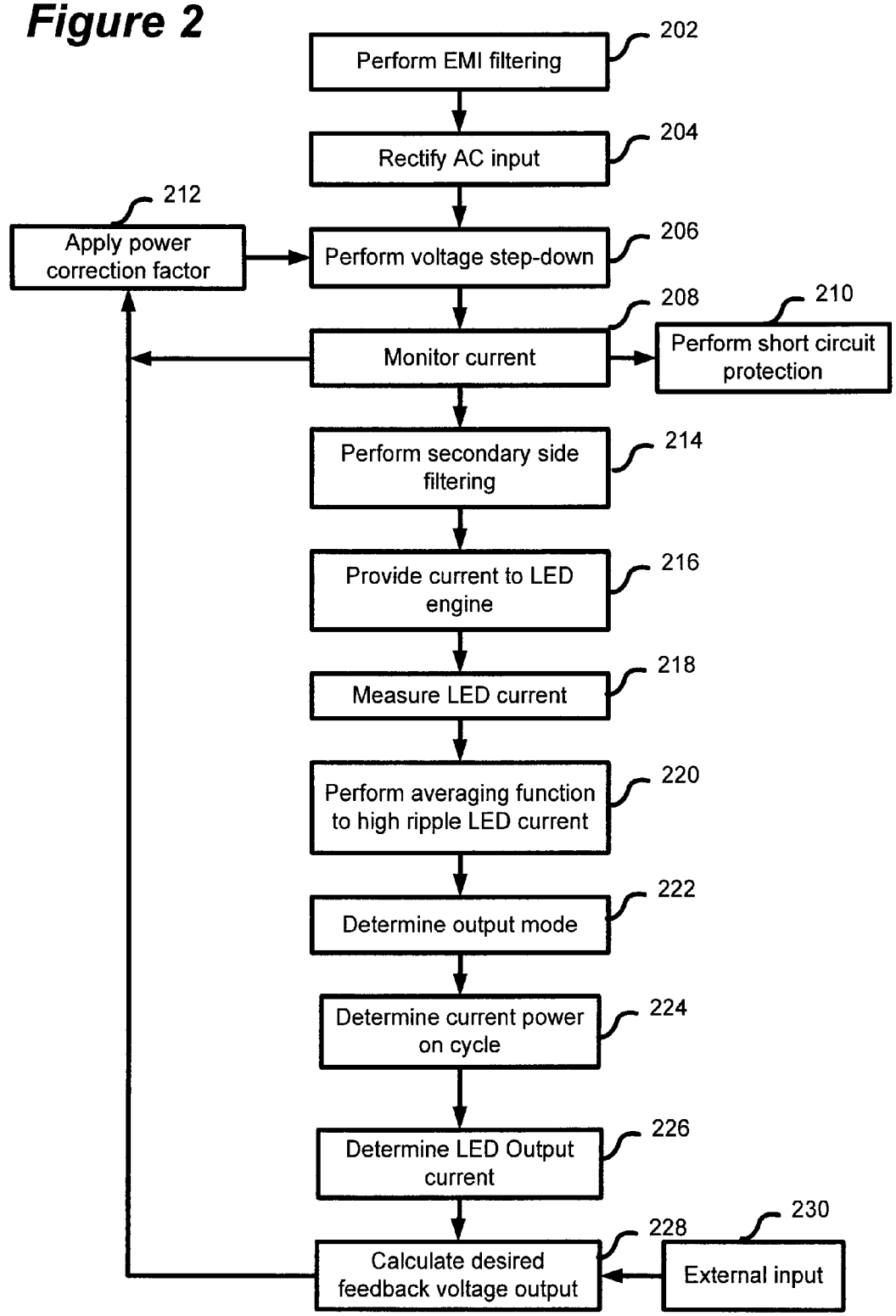
FIG. 2 shows a method of operating an LED power supply.

FIG. 2 shows a method of operating an LED power supply as shown in FIG. 1. EMI filtering of incoming AC current is performed at 202. The AC input is then rectified at 204 to convert the AC to full-wave DC voltage and current. At 206 the rectified DC voltage is stepped down to lower voltage DC, for example voltage step-down is performed form 165 Volts to 36 Volts. The primary current is monitored at 208 by the PFC circuit 114. If current exceeds design tolerances short circuit protection is performed by the PFC circuit 114 at 210.

Based upon the desired output current, a PFC value can be applied to the PFC circuit 114 at 212 to ensure the desired current is supplied. Secondary side filtering may then be performed at 214 to reduce ripple from voltage and current to provide cleaner output. The stepped down, and possibly filtered, current is then applied to the LED engine at 216. The LED current is measured at 218. The micro-controller can then determine the average current passing through the LEDs at 220. In order to determine the average current passing through the LEDS, the micro-controller may average the sensed voltage signal which may have a high ripple (i.e. 120 Hz). The output mode of the LED is then determined at 222 where the micro-controller is programmed to provide constant current or pre-programmed ramp-over-time current to adjust output of the LED. The current turn-on cycle is determined by the micro-controller at 224 to determine the "age" of the fixture by counting turn-on cycles. At 226 the micro-controller 120 determines required LED current to achieve the desired LED output. The micro-controller 120 can then send a feedback signal, for example the PFC value 115, to the PFC circuit 114 to adjust the required current to the LED. The feedback signal may be determined for example, by calculating the desired feedback voltage output based on the gathered data at 228. External input s230 may also be provided to the micro-controller such as signals from motion sensors 122, a wireless TX/RX interface 124 or ambient light and/or light output sensor 126. Additional input may be provided in calculating the desired on/off state, light intensity or current required to maintain a light intensity of the LED fixture.

Figure 3:
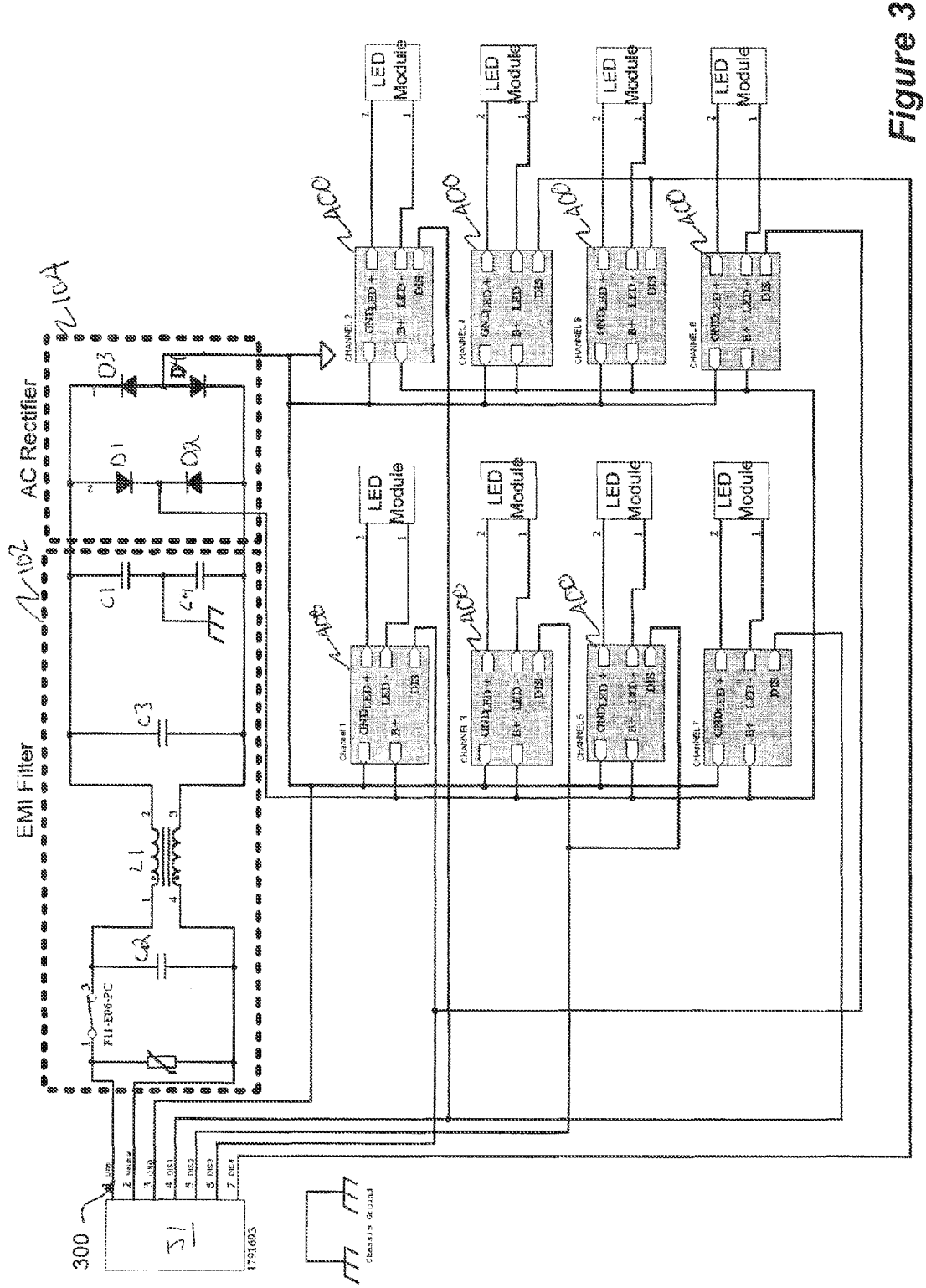
FIG. 3 shows a detailed first stage of the power supply.

A detailed schematic of a first stage 300 of the power supply is shown in FIG. 3. The first stage is the input stage of the power supply. The AC mains, i.e., the cables that come up to the LED light in the light pole, is brought into the power supply via the surface mount 'poke in' connector (J1) and passes through the EMI (electromagnetic interference) filter (C2, L1, C3, C1, C4). This is a standard filter design which is required to help limit EMI levels to within EN55015 and EN61547 requirements. The AC voltage is then rectified to a DC voltage using a discrete diode bridge (D1, D2, D3, and D4). Using discrete diodes allows the greatest amount of flexibility in choosing over rated components to exceed the designed current and voltage rating, ensuring the highest level of efficiency and life from the bridge. Standard diodes are used vs. fast or ultra fast diode to help slow the rise time of the waveform which helps limit current spikes and harmonics reducing EMI. The output of this stage feeds 8 separate channels, although more or less channels may be used.

Figure 4:
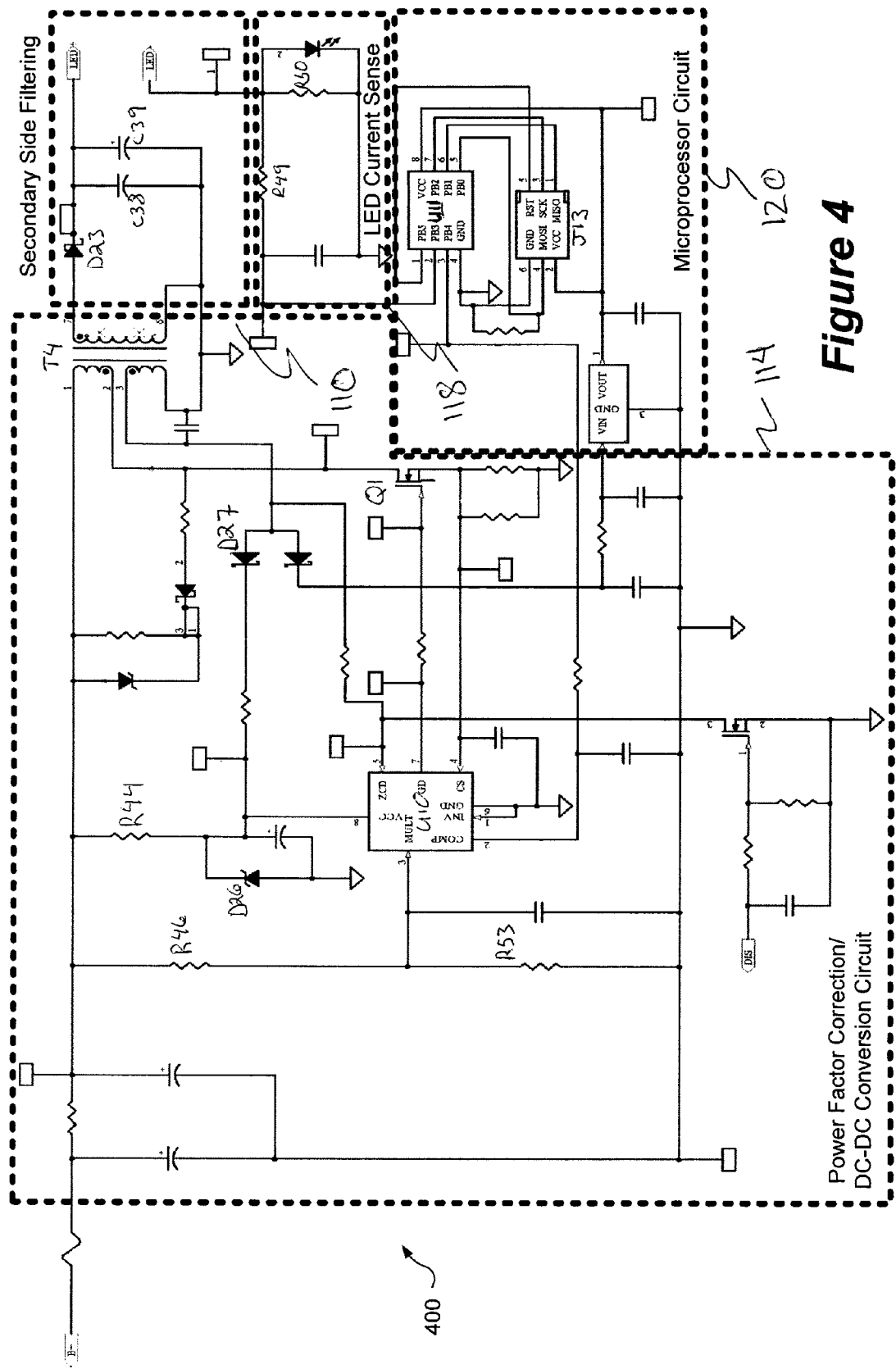
FIG. 4 shows a detailed second stage of the power supply.

The second stage 400, as show in FIG. 4 consists of the power factor corrected flyback converter and the micro-controller based feedback loop. Power factor is the ratio between the apparent power supplied by the utility and the real power used by the power supply. By keeping the current driving the LED's in phase with the input voltage from the utility, a high power factor can be achieved. This, in conjunction with limiting the total harmonic distortion, ensures a high overall power factor meaning that the apparent power and the real power are very close to being the same, resulting in very little wasted energy between the utility and the power supply. By using a power factor correction chip (such as U10 ST L6562) for both power factor correction and flyback switching, the more standard pulse width modulation (PWM) IC that is used for switching the flyback (T4) can be eliminated, reducing the parts count and increasing the efficiency of the supply by up to 5%. Another benefit of only using a single PFC stage is that it can handle a large ripple voltage from the rectified mains and so a much lower value filter capacitor (C40, C41) can be used. This allows a non-electrolytic capacitor (aluminum electrolytic capacitors, due to their construction, are a major source for reducing reliability), such as a film and ceramic capacitors, to be used. Film and ceramic capacitors have a much higher reliability and life than aluminum electrolytic, and are used exclusively in the power supply design.

The PFC controller switches the rectified DC voltage from the bridge rectifier at a nominal frequency of 120 kHz via Mosfet Q1, having its drain connected to the primary of the flyback transformer T4. The frequency at which the more stringent European standards (CISPR 22, EN55022) begin to measure for EMI is 150 kHz. 120 kHz was chosen to keep the transformer as small as possible and switching losses to a minimum, while ensuring the primary frequency was well enough below 150 kHz to making it easier to attenuate the higher frequency harmonics to comply with EMI standards. A lower frequency could have been selected, however transformer size increases as frequency goes down. Initial power for U10 is provided by R44. Once the circuit is operating, the auxiliary winding of T4 supplies the power required by U10 through D27 pin 1. Zener diode D26 ensures the voltage to U10 cannot exceed its maximum voltage limit.

U10 samples the rectified mains voltage through R46 and R53 and switches the gate of Q4 so that the current flow produced in the transformer T4 is in phase, or sync, with the input voltage.

The Mosfet (Q1) is over sized with regards to the current rating to provide a greater amount of reliability as well as a low Rds_on (the "on" resistance of the Mosfet when it is turned on between the drain and the source). Higher current Mosfet typically have lower Rds_on due to having more semiconductor material to carry current. This reduces the power losses associated with the Mosfet.

The transformer (T4) consists of the primary winding which is coupled to the switcher, the secondary winding which provides the reduced 36V output and an auxiliary winding which provides the power to the PFC controller and micro-controller after the circuit is up and running. The flyback transformer uses an RM6 core for high efficiency, compact size, and low inductance leakage which reduces stress on the Mosfet Q1 and reduces EMI.

The output provided by the secondary winding (pin 6,7) of the transformer (T4) consists of the output filter and current sense. The output rectifier D23 is a silicon carbide diode which has zero recovery time eliminating switching losses, is extremely reliable, and highly efficient. Normally, two rectifiers are used so as only half the current will flow through either of them, further improving reliability and efficiency by ensuring the diodes are operating well below their limits. By using a silicon carbide diode, only one needs to be used to get the same benefits as using 2 rectifiers. Only 2 uF of capacitance (C38, C39) is required on the output as the LED's inherently provide voltage regulation to the output. This allows the use of non-electrolytics on the output, increasing reliability. The output ripple is at 120 Hz due to the PFC topology and low output capacitance, which meets Energy star requirements and is high enough to eliminate any visible flicker in the LEDs.

The current sense is simply a low value resistor (R50) which develops a small voltage across it when current flows through the LED's. This small voltage is sent to the micro (U11) through R49 as the feedback voltage is directly proportional to the current flowing through it.

The processor, such as the Atmel micro-controller, U11 (ATTiny85), receives the feedback voltage from R49 and performs an averaging function as the voltage has a high 120 Hz ripple content resulting from the low capacitance output filter and the PFC topology. The averaged voltage provides the average current passing through the LED. The desired control scheme (current/time ramp. constant current, time-based dimming, or combinations thereof etc) is selectable using a jumper on J13. Future upgrades can also be performed by connecting the appropriate programmer to J13.

The programming scheme micro-controller is to start the LED's at a reduced lumen output by running each string of LEDs at 160 mA. This provides the required IES lumen output for an equivalent, 100 W HPS cobra head. As the LED's age over time, and dirt depreciation of the optics increases, the micro-controller increases the current by a set amount at every turn-on cycle so that at year 20, the LED's will be running at their full rated current level of, for example, 300 mA. Running the LED's at a lower current not only reduces power consumption by an initial 50%, but their life is also increased. The micro-controller counts and keeps track of each time power is applied to it and stores the data in its on board memory. This does not need to be precise as the amount of dirt depreciation over time is impossible to predict and the lumen depreciation over time is only an estimate, so the increase in current is strictly a linear ramp up over time. In contrast, an HPS cobra head begins initially at a higher lumen output, and drawing more power to compensate for the reduction in lumen performance as the light ages so that it will still produce the required IES lumen output at end of life. By incorporating a micro-controller based closed loop feedback to control current; many other features can be added to the core design. Some examples included motion detection to turn on or increase light levels only when a vehicle or pedestrian is present, temperature compensation to reduce current to the LED's if they are running too hot ensuring a longer life, time of day dimming to have the light come on or adjust light levels to coincide with traffic cycles, and remote control operation to allow a remote user to adjust light levels in real time or change the programming of the micro for particular events such as festivals, emergencies, tourist season, etc. . . . U11 receives power from the auxiliary winding of T4 through the 5V regulator U12.

The power supply is designed specifically to meet the requirements of the optimal amount of series LED's for a given application. The optimal amount of LED's in a series for balancing efficiency and modularity while complying with class 2 power supply requirements is, for example, 12 LED's. 12 LED's per string provides maximum modular flexibility by providing the light levels required with the least amount of extra LED's. It will be apparent that other numbers of LEDs may be utilized. This also greatly reduces cost and power levels by using the least amount of LED's required. The power supply is capable of supplying, for example 40V at 350 mA per string, which is the maximum voltage the 12 LED's would draw, keeping the output voltage well below the 60V limit for class 2 operation if required. The fixture is scalable to higher wattages simply by adding more strings of LED's and the additional power supply channels to run the strings individually.

To achieve the greatest amount of energy savings and have the greatest effect on reducing green house gases, the efficiency and power factor of the power supply needs to be as high as possible. This reduces the amount of wasted energy consumed by the power supply and not delivered to the load. It is possible to have a high efficiency and a low power factor or a high power factor and low efficiency, but both have a significant effect on overall energy savings and green house gas reduction and, therefore, the power supply must be designed to account for both factors. The describe power supply is 90%+ efficient with a power factor of >0.98. This was achieved by using only a single stage, PFC flyback converter design. This reduces the power losses of 1 stage from a more typical 2 stage approach.

The power supply incorporates a micro-controller based closed loop feedback circuit. The load current can be manipulated by the micro-controller, U11, which varies the voltage to pin 3 (compensating pin) of U10. The voltage signal provides the PFC value to U10. The micro-controller is capable of receiving the data from many external sensors and/or other circuits, and then processes that data according to the algorithms that were programmed into the micro-controller to control the LED's. This allows great flexibility to increase the power supplies functionality and add new features, while keeping the cost of the power supply relatively low as compared to other power supplies with built-in smarts (DMX controls, etc. . . . )

The power supply may also include a disable (DIS) input that may be used to selectively disable the output of the power supply. This may be used advantageously, for example to shut down one or more LED modules of a fixture.

Figure 5:
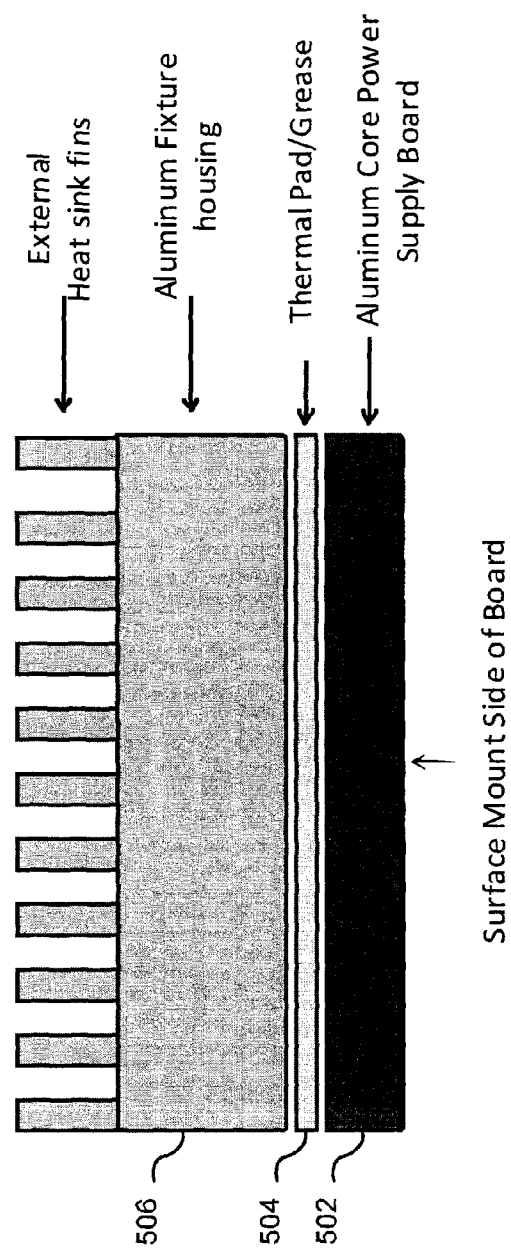
FIG. 5 shows a representation of power supply mounting in a light fixture.

The power supply has a life rating of 20+ years. Heat is the main cause of component failure and reducing product longevity. We have minimized the effects of heat in several ways. Selecting components that have an extended temperature range of at least −40 C to +125 C, which are typical of automotive and military grade components, makes certain the components will be operating well with its thermal design limits keeping the thermal stress on them very low. The circuit board 502 will be a metal core, single sided board that fastens directly to the fixture housing 506, with thermal grease or pad 504 as an interface as shown in FIG. 5.

This allows the power supply to make use of the external fixture heat-sink to efficiently transfer the heat of the power supply, which is in an IP 66 enclosure, to the outside where air currents can act as an active cooling system. Another major cause of failure in street lighting is vibration. Roadway lighting fixtures must endure intense vibrations from wind, traffic, utility power conditioning equipment (transformers, Capacitor Banks, etc. . . . which are mounted on the same pole with the fixture) operating at 60 Hz, and other man-made or natural phenomena. Has been accounted for in several ways. All components are surface mount type to facilitate mounting to a metal core board. This allows all component bodies to lay flat on the board which offers the most support and eliminates the need for components to be supported only by their leads. Vibration sensitive components have RTV silicone added to improve vibration reliability.

Based on the modularity in design any number of LED blocks may be used. For example, 24 LED blocks may be provided for a complete desired light distribution on the roadway or other surface, the LED light fixture can also be fabricated with light engines (12 LEDs in the left light engine and 12 LEDs in the right light engine) that contain a total of 24 LEDs. This would constitute a light fixture with only 24 LEDs and a single channel power supply. As a result the overall size of the LED light could be appropriately smaller and lighter, yet offer the same distribution desired but with a total lumen output that corresponds to 24 LEDs. Likewise, LED lights can be fabricated with 2 blocks of 24 LEDs, for a total of 48 LEDs and the power supply would have 2 channels. The LED light would be fabricated to incorporate just 48 LEDs in this case. This same approach of fabricating LED lights with different numbers of 24 LED blocks provides the ability to design and fabricate any size of LED light that specifically optimizes the design for the number of LED blocks desired.

The power supply is lead free. An Organic Solderability Preservative (OSP) finish is used to provide a more robust finish and better reaction with lead-free solder. Lead-free solder and components are used for compliance with RoHS.

To reduce production time and simplify the production process, poke-in connectors are used for the input and output wire connections. This eliminates the need for crimp connectors and only requires the end of the wire to be stripped. Being a one piece, surface mount connector, it is less susceptible to possible disconnection due to vibration.

Time-of Night Dimming

The dimmable power supply enables Time-of-Night dimming to be performed. The internal power supply is configured to execute a pre-programmed dimming schedule as required by the end customer of the street light. The dimming is based on the time of night as determined by the system.

The Time-of-Night dimming function is based on the principle that for a given geographic location, the actual time of day can be determined with good accuracy if the number of hours of between sunset and sunrise are known, and if the time relative to sunset is known. The logic program performs two primary functions, firstly, it uses a special logic algorithm to determine the time of day, secondly, it executes the pre-programmed dimming schedule based on the determined time of day.

To determine the time of day, the microprocessor 120 records the time period from sunset to sunrise for every twenty-four (24) hour period of operation to the nearest 15 minutes. It does this by recording its hours of operation, which is defined by the Streetlight (Dusk-to-Dawn) Photo Control (light sensor 126) that provides a switched source of power to the system. The microprocessor 120 averages these measurements over a period of up to eight (8) days to determine an averaged result. This result is then compared to a data table stored in a memory coupled to the microprocessor 120 or internally stored in the microprocessor. This data table 128 consists of sunrise and sunset times for all twelve (12) months of the year, for the specific geographic location in which the streetlight is located. By comparing the averaged result to the data in the table, the microprocessor can determine in which part of the year it is operating, and the actual sunset time.

When the microprocessor knows the sunset time, and knows that its operation starts at each sunset, it can execute the pre-programmed dimming schedule to within the system accuracy, which is its second primary task. The pre-programmed dimming schedule can provide a gradual increase of light output of the light fixture during sunset and a gradual decrease during sunrise. In addition, the maximum output of the light fixture can be adjusted based upon illumination conditions at a particular time of year.

The logic algorithm has been developed to execute the dimming schedule if at least two consecutive sunset-to-sunrise measurements have been made that are within measurement accuracy of each other. In the case of insufficient data to execute the dimming schedule, the streetlight will be set to full brightness as a fail-safe mechanism. In the case of a hardware malfunction of the dimming system, the streetlight is automatically set to full brightness as a fail-safe mechanism based on the hardware design.

The logic algorithm also includes special logic to handle the case of measurements that are beyond the allowed measurement accuracy. In this case, of measurements beyond the allowed measurement accuracy, the system will clear internal measurement data and set the streetlight to full brightness until at least two consecutive measurements within measurement accuracy have been recorded. This logic safely handles the case of data corruption due to a random power interruption, or a situation where a streetlight is stored for a period of time.

Figure 6:
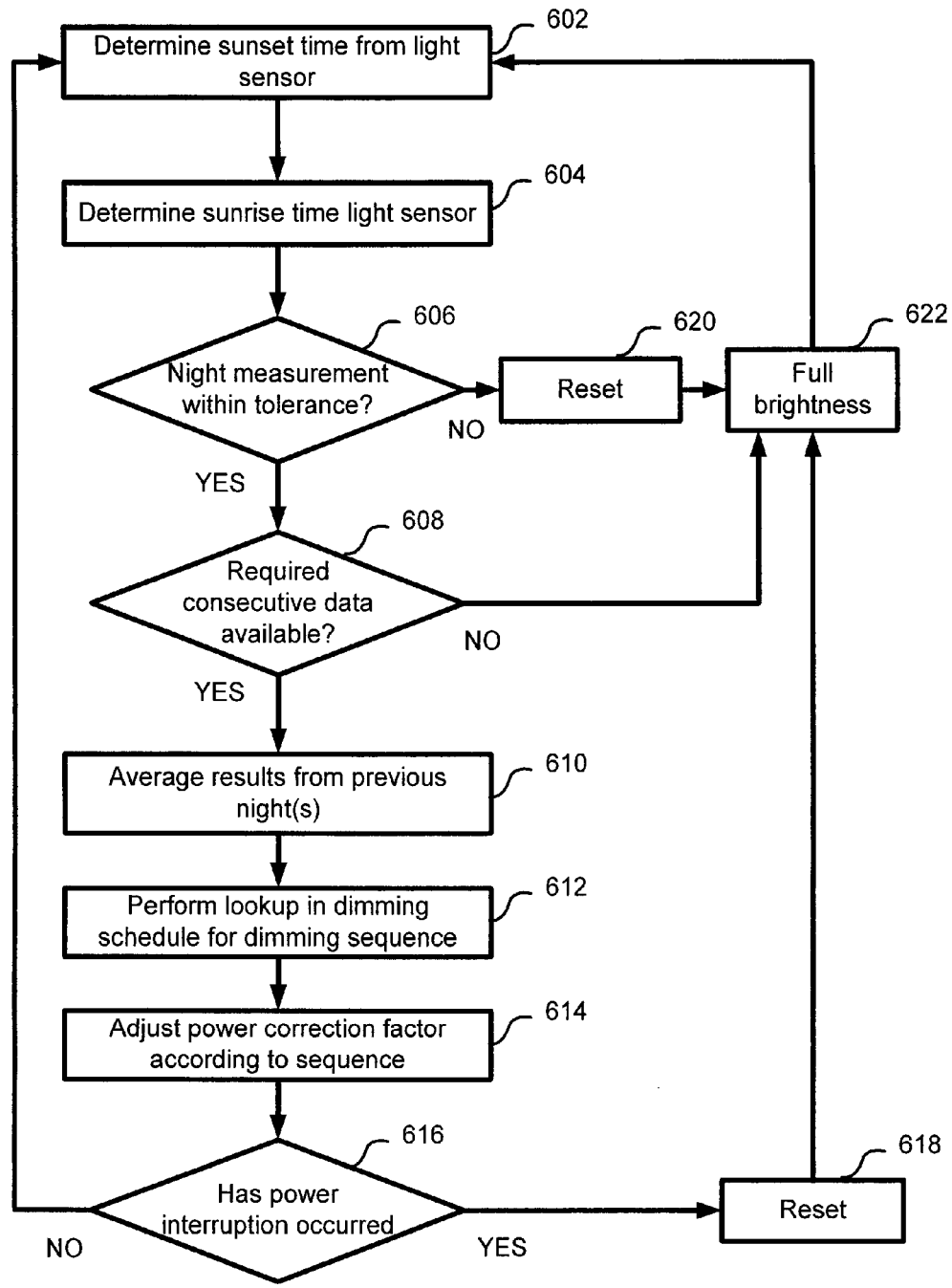
FIG. 6 shows a method for performing Time-of-Night dimming.

As shown in FIG. 6, at sunset, at 602 the mains power is applied to the streetlight micro-processor, through the normal operation of the standard photo control. The micro-processor starts recording the time that passes, relative to the time of sunset (turn-ON). The length of the night period is determined based upon detection of sunrise at 604. Length measurement of the night period is then determined. If the measurement is within tolerance in that the period is not excessive large or small, YES at 606, the microprocessor determines is a predefined number of night periods has been stored, for examples, at least two night periods. If the predetermined number of period are stored in memory, YES at 608, the micro-processor calculates the average time period at 610 from sunset to sunrise for the past number of days, up to an upper threshold such as the previous eight (8) days known as the (average) sunset-sunrise-duration. Alternatively if sufficient night periods have not been stored to provide the required consecutive data the LED module illumination is set to full brightness at 622 during the illumination period. Note that if the data for eight (8) days has not been gathered yet, the micro-processor will average only the data that has been gathered so far. Based on the (average) sunset-sunrise-duration value, the micro-processor can make an estimate of the time of sunset to the nearest fifteen (15) minutes. A lookup is then performed at 612 in a dimming schedule table to determine an associated dimming sequence defining PFC values and the time or period of time for applying the value for controlling the illumination output of the LED modules. The lookup will match the average night period to the desired dimming sequence. The output can then be controlled at 614 by applying the desired PFC values at the times defined in the sequence at 614.

At each turn-ON, corresponding to sunset, the micro-processor performs a check of each new sunset-sunrise-duration measurement before that measurement is stored within the set of eight (8) previous measurements. If the new measurement is not within measurement accuracy of the values, NO at 606, in the measurement set, the micro-processor will clear the previous measurements at 602 and will set the streetlight to full brightness (without dimming) or a predetermined value for the current night at 622. The micro-processor will store the new measurement as the first potentially correct reading at continuing at 602.

Knowing the time of sunset to the nearest fifteen (15) minutes, and the time since sunset (turn-ON), the micro-processor can estimate the current time of day within an accuracy of 15 minutes. With the time of day determined within an accuracy of fifteen (15) minutes, the micro-processor can control dimming start and dimming stop functions within an accuracy of fifteen (15) minutes (assuming that there is no error introduced by the photo control operation).

The micro-processor includes logic that correctly handles the case of a power interruption. The logic is the same, regardless of whether the power interruption is short term (several seconds) or long term (up to years). If a power interruption as occurred, YES at 616, the stored at is reset and the LED module is set to full brightness 622 until sufficient data has been stored.

On the subsequent turn-ON, if the next measurement is within measurement accuracy of the previous reading, the micro-processor will use the two (2) stored measurements to execute the programmed dimming schedule. If the new measurement is not within measurement accuracy of the data already stored, the reset logic described will repeat, and again the streetlight will be set for full brightness for the current night.

In the case of a short-term power interruption, the micro-processor may have captured a sunset-sunrise-duration that is greatly in error. In this case the micro-processor may observe an unusually short reading that is not within measurement accuracy of the set of measurement data. The micro-processor will execute full brightness for one night, reset the system and use the short reading as the first potentially correct reading. On the second night, the micro-processor will observe a much longer reading than the previous erroneous short reading. The micro-processor will execute full brightness for a second night, reset the system and use the long reading as the first potentially correct reading. On the third night, the micro-processor will observe a second long reading that is within measurement accuracy of the reading from the previous night. Now based on having two readings within measurement accuracy, the micro-processor will execute a dimming schedule for the third night. To summarize, a short power interruption will potentially result in two (2) days of full brightness (no dimming) and a restart of the dimming schedule on the third night. Note that it will take eight (8) days without a power interruption to have a full data set and therefore optimum accuracy.

In the case of a long term power interruption, as may occur when a streetlight is put into storage for a period of time, the micro-processor logic will ensure two days of full brightness (no dimming) for two (2) days, and then correct dimming on the third day if the correct maintenance procedure is followed. If prior to the storage, the streetlight is disconnected during daylight, the streetlight is left with a complete set of valid data. To force the micro-processor to reset its data, a required maintenance procedure is required. The procedure involves simply powering up the micro-processor by bypassing the photo control with a shorting cap for a period of one (1) minute, and then removing power.

This procedure will cause the micro-processor to record a very short sunset-sunrise-duration which will lead to a system reset. The result will be two (2) days of full brightness (no dimming) and correct dimming on the third day, since the procedure will cause the micro-processor to experience a short-term power interruption.

If the maintenance procedure is not followed, the micro-processor may exhibit incorrect dimming for the first day of operation, and then full brightness (no dimming) on the second day of operation, and correct dimming on the third day and subsequent days of operation.

Inaccuracy in the dimming schedule will be caused by several factors as follows: Some degree of error will be introduced by the sunset and sunrise switching of the photo control. This error will depend on the exact installation and may be based on the photo control model, the photo control installation, and weather conditions. The micro-processor averages measurements of sunrise-sunrise-duration data over a period of eight (8) days to minimize the effects of random error such as that caused by weather conditions for example.

Error is introduced by the fact that the system has a time resolution of fifteen (15) minutes, so that the time of day can be known within an accuracy of fifteen (15) minutes. To ensure that any system inaccuracy does not affect streetlight safety, the micro-processor is programmed so that system inaccuracy causes a loss of low light level only and never a loss of high light level. The inaccuracy, then, reduces energy savings but not safety. Each installation of a group of streetlights using Time-of-Night dimming must be performed with an assessment of the actual system inaccuracies, so that the micro-processor is configured accordingly.

A summary of the Time-of-Night dimming function is provided in Table 1.

TABLE 1

Time-of-Night dimming function summary

| | Remainder of Night | Night 1 | Night 2 | Night 3 |
|---|---|---|---|---|
| Initial Power Up (Factory Configuration) | N/A | Full Brightness | Full Brightness | Dimming according to schedule |
| Short Power Interruption (1 second to 20 hours) | Full Brightness | Full Brightness | Full Brightness | Dimming According to schedule |
| Long Power Interruption (greater than 20 hours) with Maintenance Procedure | N/A | Full Brightness | Full Brightness | Dimming according to schedule |
| Long Power Interruption (greater than 20 hours) without Maintenance Procedure | N/A | Out-of-Date Dimming Schedule (depending on length of power interruption) | Full Brightness | Dimming according to schedule |

It will be apparent to one skilled in the art that numerous modifications and departures from the specific embodiments described herein may be made without departing from the spirit and scope of the present disclosure.

The invention claimed is:
1. A method of controlling a power supply for light emitting diode (LED) module in a roadway fixture, the method comprising:
performing electro-magnetic interference (EMI) filtering of an incoming alternating current (AC) current;
performing AC to direct current (DC) rectification of the AC current;
stepping down the rectified DC current based upon a power correction factor (PFC) value;

providing the stepped down DC current to the LED module;
measuring a current through the LED module;
determining the PFC value based upon at least the measured current through the LED module;
feeding-back the determined PFC value to control the stepped down DC current; and
determining a turn-on cycle used in determining an age of the LED module for a ramp-over-time current mode to provide an increasing current to the LED module to maintain illumination output over time by adjusting the PFC value.

2. The method of claim 1 further comprising performing secondary filtering of the stepped down DC current to reduce ripple of voltage and current.

3. The method of claim 1 wherein measuring the LED current further comprises averaging the measured current which has a high voltage ripple content to determine an average current passing through the LED module.

4. The method of claim 1 further comprising determining an output mode of the roadway fixture based upon a constant current mode to provide a constant current over the life-time of the LED module by adjusting the PFC value to maintain a constant current through the LED module.

5. The method of claim 1 wherein the PFC value is further determined based upon a determined output mode and the determined age of the LED module.

6. The method of claim 1 wherein calculating the PFC value is further based upon an external input.

7. The method of claim 6 wherein the external input is selected from the group comprising: a motion sensor, a wireless transmitter/receiver, a light output sensor and an ambient light sensor.

8. A method of controlling a power supply for light emitting diode (LED) module in a roadway fixture, the method comprising:
performing electro-magnetic interference (EMI) filtering of an incoming alternating current (AC) current;
performing AC to direct current (DC) rectification of the AC current;
stepping down the rectified DC current based upon a power correction factor (PFC) value;
providing the stepped down DC current to the LED module;
measuring a current through the LED module;
determining the PFC value based upon at least the measured current through the LED module; and
feeding-back the determined PFC value to control the stepped down DC current;
wherein the PFC value is further based upon a dimming sequence retrieved from a dimming schedule defining a desired light output level of the LED module over a length of a night period wherein the dimming schedule is determined by:
determining the length of the night period from a sunset time and a sunrise time determined from a light sensor;
storing the determined length of the night period in memory;
determining if a required plurality of lengths of consecutive night periods have been stored;
averaging the required plurality of lengths of consecutive night periods; and
performing a lookup in a dimming schedule based upon the average length of the night period to determine the dimming sequence associated with the length of the night period.

9. The method of claim 8 wherein if the required plurality of lengths of consecutive night period has not been stored the desired light output level of the LED module is set to a default value.

10. The method of claim 8 further comprising clearing the stored consecutive night periods if the determined length of the night period is not within a defined tolerance range and wherein the desired light output level of the LED module is set to a default value.

11. The method of claim 8 further comprising determining that a power interruption has occurred and clearing the stored consecutive night periods and wherein the desired light output level of the LED module is set to a default value.

12. A power supply for use with a light emitting diode (LED) module in a roadway lighting fixture, the power supply comprising:
an electro-magnetic interference filter for filtering an alternating current (AC) current;
an AC rectifier for rectifying the AC current to a direct current (DC) current;
a power factor correction (PFC) circuit maintaining the DC current waveform in phase with line voltages by switching a transformer based upon a received PFC value;
a secondary side filtering module for reducing voltage and current ripple in the DC current;
an LED current sensor module for detecting a current value used by the LED module in a return line from the LED module; and
a micro-controller for monitoring the LED current and processing input to determine the PFC value to be applied to the transformer based upon the detected LED current value;
wherein the micro-controller utilizes high ripple voltages representing a proportional current and is averaged and compared to a set value programmed in the micro-controller memory to determine the PFC value.

13. The power supply of claim 12 wherein the micro-controller counts each turn-on sequences and stores it into its internal memory to keep track of how many days to determine the PFC value to compensate for LED output degradation due to aging.

14. The power supply of claim 12 wherein the micro-controller receives input from a wireless transmitter/receiver to be used in determining the PFC value.

15. The power supply of claim 12 wherein the micro-controller receives input from a motion sensor to be used in determining the PFC value.

16. A power supply for use with a light emitting diode (LED) module in a roadway lighting fixture, the power supply comprising:
an electro-magnetic interference filter for filtering an alternating current (AC) current;
an AC rectifier for rectifying the AC current to a direct current (DC) current;
a power factor correction (PFC) circuit maintaining the DC current waveform in phase with line voltages by switching a transformer based upon a received PFC value;
a secondary side filtering module for reducing voltage and current ripple in the DC current;
an LED current sensor module for detecting a current value used by the LED module in a return line from the LED module; and
a micro-controller for monitoring the LED current and processing input to determine the PFC value to be applied to the transformer based upon the detected LED current value;

wherein the micro-controller receives input from a light output sensor to be used in determining the PFC value and further comprises a memory for storing a dimming schedule table comprising a plurality of dimming sequences each based upon a length of the average night period, the dimming sequences defining one or more associated PFC values to be applied over an illumination period.

17. The power supply of claim 16 wherein the dimming schedule is determined by the micro-processor by:
   determining the length of the night period from a sunset time and a sunrise time determined from a light sensor;
   storing the determined length of the night period in memory;
   determining if a required plurality of lengths of consecutive night periods have been stored;
   averaging the required plurality of lengths of consecutive night periods; and
   performing a lookup from the dimming schedule table based upon the average length of the night period to determine the dimming sequence associated with the length of the night period.

18. The power supply of claim 17 wherein if the required plurality of lengths of consecutive night period has not been stored the desired light output level of the LED module is set to a default value.

19. The power supply of claim 17 further comprising clearing the stored consecutive night periods if the determined length of the night period is not within a defined tolerance range and wherein the desired light output level of the LED module is set to a default value for the dimming sequence.

20. The power supply of claim 19 further comprising determining that a power interruption has occurred and clearing the stored consecutive night periods and wherein the desired light output level of the LED module is set to a default value for the dimming sequence.

21. The power supply of claim 16 wherein the micro-controller receives input from a wireless transmitter/receiver to be used in determining the PFC value.

22. The power supply of claim 16 wherein the micro-controller receives input from a motion sensor to be used in determining the PFC value.

* * * * *